J. E. DODD.
GARDEN TOOL.
APPLICATION FILED FEB. 18, 1920.
1,348,096.
Patented July 27, 1920.
2 SHEETS—SHEET 1.
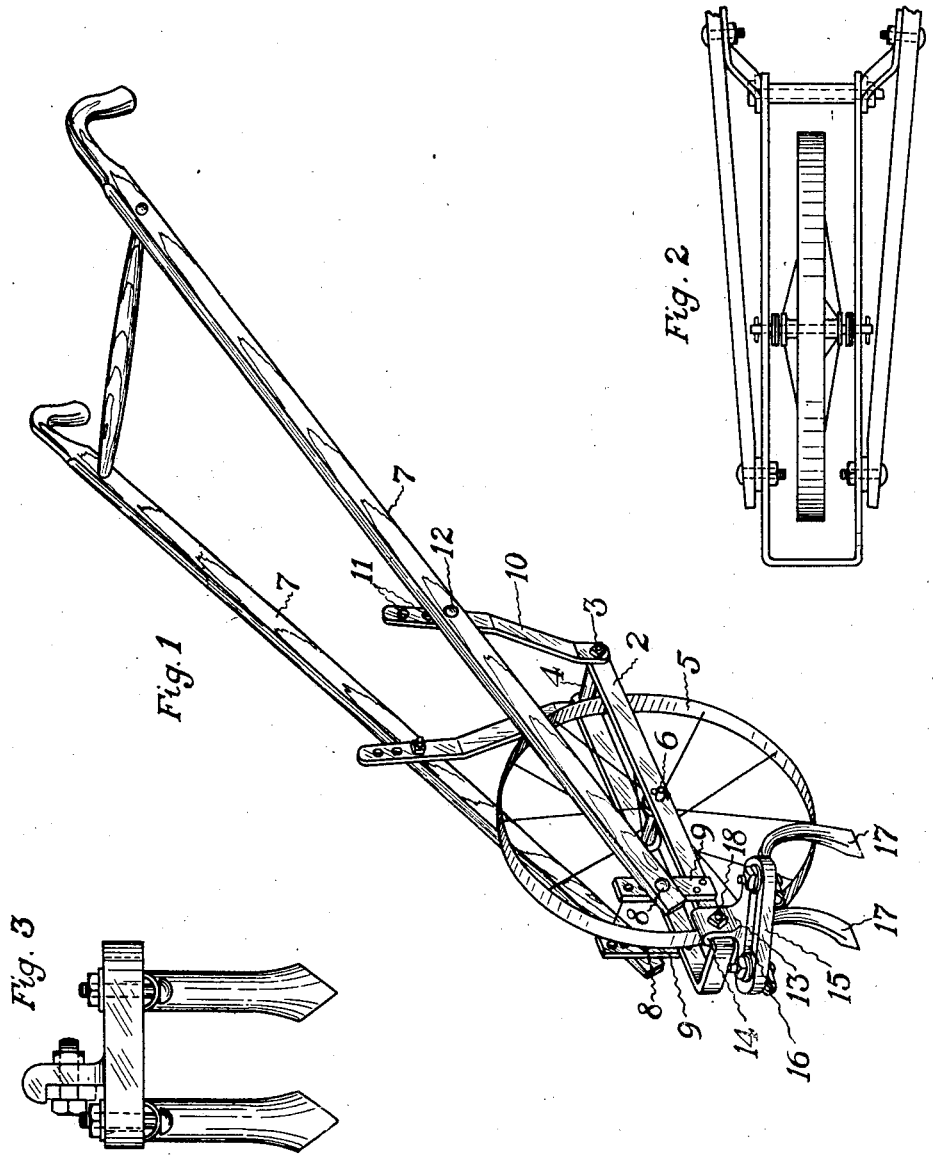
Inventor
J. Ellis Dodd
by
Attorney

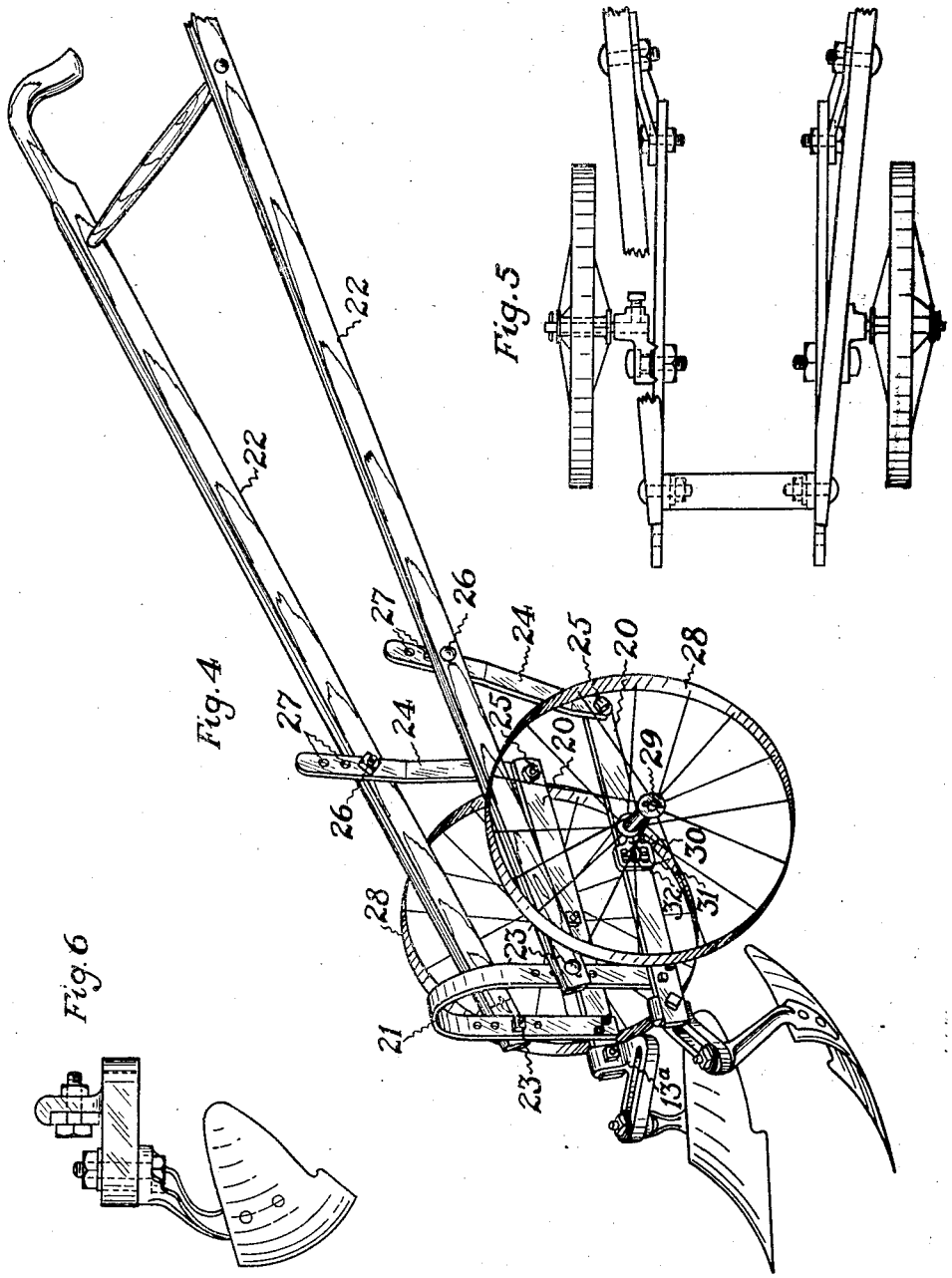

UNITED STATES PATENT OFFICE.

JAMES ELLIS DODD, OF PEORIA, ILLINOIS.

GARDEN-TOOL.

1,348,096.　　　　Specification of Letters Patent.　　Patented July 27, 1920.

Application filed February 18, 1920. Serial No. 359,485.

*To all whom it may concern:*

Be it known that I, JAMES ELLIS DODD, a citizen of the United States of America, residing at Peoria, in the county of Peoria and State of Illinois, have invented certain new and useful Improvements in Garden-Tools, of which the following is a specification.

This invention relates to garden tools.

The invention has special reference to a garden tool of the kind used in cultivating by hand.

One object of the invention is to develop a relative arrangement between the wheel or wheels of the cultivator and the cultivating members, whereby the latter will be disposed in advance of the wheel to the end that closer approach may be made to field or garden closure means or to obstructions within the cultivated plot. Also, the relative arrangement of supporting wheel or wheels and the cultivating members indicated is developed with the further object and purpose of cultivating depth control and for better facilitating the entrance and maintenance of the cultivating tools in cultivating relation with the soil.

Another object of the invention is the provision of framing members for association with the wheel or wheels of the cultivator and the cultivating tools, that are very simple and light and the correlation of the same for relative adjustability to readily adapt the device to varying conditions of use.

Another and vitally important object of the invention is the special manner of relating the cultivating members to the frame to the end that the working tools and the plants to be cultivated are at all times in plain view of the operator.

With these and other objects in view, as will appear from time to time in the attached specification and claims, the invention consists in certain detail novel constructions, combinations and arrangements, as will be hereinafter more particularly set forth and claimed.

For the better understanding of the invention, reference is made to the accompanying drawings showing two forms of embodiment of the novel device, and in which corresponding parts respectively of the two embodiments, are indicated by similar reference characters.

Figure 1 is a perspective view of the device embodied in a single wheel cultivator;

Fig. 2 is a plan view showing the general framing elements of the one wheel cultivator shown in Fig. 1;

Fig. 3 is a detail view of the tool support and showing the manner of relating the same to a framing member of the cultivator shown in Fig. 1;

Fig. 4 is a perspective view of the device embodied in a two wheel cultivator;

Fig. 5 is a plan view showing the general framing elements of the two wheel cultivator shown in Fig. 4;

Fig. 6 is a detail view of the tool support and showing the manner of relating the same to framing members of the two wheel type shown in Fig. 4.

Wide experience in connection with the sale and distribution of garden plow devices of the hand type has developed knowledge as to inefficiency of devices that have been marketed. Hand cultivators wherein the cultivating members are disposed at the rear of supporting frames and wheel or wheels have proven ineffective for a number of years, and principally because of the fact that it is impossible to cultivate close to garden plot inclosure fences or walls, or abnormal obstructions within the garden plot, and there has been a growing demand for a more convenient cultivating tool.

The applicant herein has noted instances of the sale and use of hand cultivators wherein a cultivating tool was disposed in advance of the wheel or wheels of the device, but in all instances of such use the general structural combinations were objectionable, some because of being cumbersome or lacking features of adjustability that are essential to a perfect working tool, but mainly the objection to such tools has been the fact that the frame and wheel of the implement prevented the user from seeing the cultivator tools while at work, that is, the relationship of the cultivating tools to the plants being out of sight, the user was not able to manipulate the implement to the best advantage.

As a result of the experience and observation above noted, the applicant herein has developed the simplest possible frame structure and correlated its parts relatively for adjustment to meet all contingencies in connection with the use of the implement, and has associated supporting members for the cultivator tools with the framing of the device in such a way that the tools are always within view of the operator as well as the plants that are being cultivated.

Applicant, as a result of experience, has directed attention to the development and the relation of the wheel or wheels, the cutting tools and the handles of the device that adapts the complete tool perfectly to meet all conditions of working, that is, hardness, or mellowness of the soil, whereby through manipulation exercised through the handles, the cutting tools may be caused to penetrate under all soil conditions, and through the leverage conditions that are presented in the matter of relating the handles, the wheel and the cutting tools, perfect cultivating depth regulation is attained.

Referring to the drawings, the invention as applied to a single wheel garden cultivator will be first described.

2 is what may be termed a main frame portion, and includes somewhat extended spaced bars which may be integrally connected at their forward ends, as shown, and may be connected by a bolt as 3 at their rear ends, with the spacing member 4 interposed. 5 is a wheel pivotally supported in frame 2 as at 6. 7 are the ordinary and usual plow handle members, the forward ends of the same being connected, as at 8, with upwardly projecting lugs or straps 9, provided with adjusting perforations 9ª as by bolt and nut, to render the connection adjustable, said lugs 9 being secured, as by rivets or bolts, to frame 2. 10 are spacing bars, their lower ends centered upon bolt 3 and normally secured by proper nut in connection with frame 2, the upper ends of said spacing members being provided with plural perforations as 11 and designed to be connected with plow handles, as at 12, by suitable bolt and nut connection in varied angular relation—the handles and frame 2—to accommodate desired relative adjustments.

Referring now particularly to cultivating tools and their supports, 13 is a tool supporting member, the same being formed with the upwardly extending lug portion 14 having a spaced downwardly turned portion for engaging the upper edge of frame 2. The main body 15 of said tool support is preferably related to the supporting or attaching lug portion 14 in the angular position shown in the drawings to best facilitate the relationship of cultivating tool members designed to be supported therein. To facilitate attachment of cultivating tools, the elongated slot 16 is provided, whereby tools, as 17, may be attached in the relative spaced relation in said support as shown in the drawings. Of course, it will be understood that a single tool or a plurality of tools may be applied to tool support 13 as the emergencies of use may require, also that any style of tool may be applied, there being necessary only the provision of proper attaching means as will render attachment convenient.

The tool support 13 may be applied to frame 2 as by bolt and nut 18, as shown in the drawings, or by any other suitable and well known means.

It will be observed from the structural combination presented in the single wheel hand plow that it is very simple, and the complete tool may be made very light; that it is susceptible of adjustability of parts to meet all emergencies in use; and especially, that the arrangement of the tool supporting member with relation to the wheel and frame of the cultivator is such that the cutting tools are, under all conditions, held in all positions of adjustment in connection with the support where they will be constantly in view of the operator, and that their relationship to the plants being cultivated may be constantly observed.

Referring now to the two wheel hand garden tool particularly shown in Fig. 4, it will be noted that the main frame in this instance, comprises spaced bars 20, the forward ends of the same being connected together by the inverted U-frame member 21, as by means of bolts, as shown. To U member 21 having the plural sets of perforations 21ª, handles 22 are connected, as by means of bolts and nuts 23, as shown, in any of the sets of perforations as desired. The rear ends of frame members 20 are held in relatively spaced relation shown by means of spacing bars 24, said bars being connected to said frame members as by bolts 25, and the handles 22 are connected with said spacing bars as by bolts 26 at option with any one of a series of perforations 27 in said bars. It will be noted that the connection of handles 27 with spacing bars 24 is such as to accommodate adjustment to change at will the angular relation between framing members 20 and said handles. Wheel members 28 are supported upon spindles 29, substantially as shown, and in connection with the attachment of these spindle members to frame 20, it is preferred to employ the adjusting lugs 30 connected with said spindles, as shown, and provided with the vertical slots 31 therein, whereby said spindles may be adjusted relative to framing members 20. Adjusting lugs 30 may be secured to the frame 20 by means of nut and bolt 32, as shown.

Referring now to the cultivating appliances, 13ª are cultivator supports of identical structure with those described in connection with the single wheel exemplification of the present invention, and as its detail structure is in exact conformity with that previously described in connection with tool supporting member 13, a particular description will not be entered here, but reference is made to the detail description of this part as set out in connection with the single wheel device exemplified in Fig. 1.

In the figures exemplifying the two wheel structure, it is shown that right and left hand plow members are employed. However, any kind or style of tool may be applied as desired, as for instance, the style of tool used in connection with the exemplification of the device shown in Fig. 1.

It will be observed in connection with the disclosure of the two wheeled hand cultivator that the relative arrangement of handles, wheels and cultivating tools is the same as of those shown and described in connection with the single wheel device, and for that reason detail description with respect to this arrangement of parts will not be entered here.

It will be noted from an examination of the drawings illustrating the two wheel structure that the framing members of the device are so related and connected as to give a clear and unobstructed view of the rows of plants being cultivated, also that the arrangement of the tool supports is such as to maintain the tools carried therein in position, at all times, within the view of the operator, thereby carrying out in the two wheel device the same thought and attaining the same practical results that have been shown to be possessed by the single wheel device, which results in the production of a hand operated garden tool that will work perfectly under all conditions of soil; will cultivate to the closest possible proximity to boundary fences, walls or abnormal obstructions, and that at all times the cultivating tools and the plants that are being cultivated will be within the view of the operator so that the danger of cutting too close to the plants or of covering the plants may be readily avoided by the simple manipulation of the handles of the plow.

From the preceding description of the parts of the two forms of embodiment of the invention herein presented, it will be readily seen that the invention provides a novel, hand operated cultivator of the utmost simplicity of construction and such adjustments and arrangements of parts that in effect produces hand plows of the utmost practical utility.

It is not intended to limit the invention to the exact forms shown herein, for it is clear that other modifications are possible within the meaning and scope of the appended claims.

What is claimed is:

1. In a garden tool comprising a wheeled frame having guiding handles and ground working members, of a support for said members consisting of a slotted horizontal arm projecting obliquely to the frame on the outside thereof in advance of the wheel, said arm having an offset upstanding lug with a face oblique to the arm bearing against said wheeled frame and secured thereto to hold the arm immovable.

2. In a garden tool of the kind described including a wheeled frame with parallel sides, of a support for ground working members comprising a horizontal arm projecting obliquely to the frame on the outside thereof in advance of the wheel, said arm having an offset upstanding lug on its rear side with a face oblique to the arm and an over-hanging lip bearing against the side of said wheeled frame and secured thereto to hold the arm immovable, and a longitudinal slot in the arm to receive the fastening devices of the ground working members, whereby said members are adjustably maintained in different transverse planes.

3. A garden tool comprising a pair of relatively spaced framing members connected at their forward portions by an inverted U-shaped framing member, a wheel connected with each of said principal framing members in a manner to facilitate relative vertical adjustment therebetween, a pair of handles connected with the frame in advance of the axial connection of the wheel with the frame, spacing bars connected with the rear portion of the frame and adjustably connected respectively with the handles, and a tool support connected to the forward portion of said frame, the tool supporting portion thereof being disposed at one side of said frame and at an angular relation thereto, whereby tool members may be applied having positions relatively in different transverse planes.

In testimony whereof I have affixed my signature.

J. ELLIS DODD.